United States Patent Office 3,419,354
Patented Dec. 31, 1968

3,419,354
METHOD FOR PRODUCING SILICON HYDRIDES
Abe Berger, Schenectady, N.Y., assignor to General Electric Company, a corporation of New York
No Drawing. Filed Dec. 23, 1965, Ser. No. 516,075
6 Claims. (Cl. 23—204)

ABSTRACT OF THE DISCLOSURE

Silicon hydrides are made from silicon halides by treating the latter with an alkali metal hydride and zinc metal or a zinc halide in the presence of a sulfone reaction medium. The sulfone is selected from the class consisting of cyclopolymethylenesulfones and diorganosulfones.

---

This invention relates to a method for forming silicon hydrides of the formula $R_aSiH_b$, where R is selected from the class consisting of hydrogen, monovalent hydrocarbon radicals, and halo-substituted monovalent hydrocarbon radicals, $a$ is from 0 to 3, $b$ is from 1 to 4, and the sum of $a$ and $b$ is 4. More particularly, this invention relates to the formation of these silicon hydrides by the treatment of a silicon halide of the formula $R_aSiX_b$, where R, $a$, and $b$ are as previously defined, and X is a halide radical selected from the class consisting of chlorine, bromine, iodine, and fluorine, with an alkali-metal hydride and a catalyst selected from the class consisting of zinc metal and zinc halides, in the presence of a sulfone reaction medium. The substituent R can be, in addition to hydrogen, an alkyl radical such as, methyl, ethyl, isopropyl, dodecyl, etc.; a cycloalkyl radical, such as, cyclopentyl, cyclohexyl, etc.; an aryl radical, such as phenyl, biphenyl, naphthyl, etc.; an aralkyl radical, such as benzyl, phenethyl, etc.; and a halo-substituted monovalent hydrocarbon radical, such as, chloromethyl, dibromophenyl, trifluoromethylphenyl, etc. The preferred starting silanes are those with lower alkyl, that is 1 to 7 carbon atoms, and phenyl substituents, such as dimethyldichlorosilane, phenyltrichlorosilane, amyldichlorosilane, etc.

Many methods have been disclosed in the prior art for forming silicon hydrides and even for forming these materials by the treatment of silicon halides. For example, Jenkner in U.S. Patent 3,043,857 discloses the formation of silicon hydrides fom silicon halides by treatment of the latter with an alkali-metal hydride in the presence of a metal-organic compound of a third group element at temperatures of from 40 to 180° C. More closely related to the present invention is U.S. Patent 3,050,366—Ringwald, where it is disclosed that silicon hydrides can be formed from halogen-substituted silanes by treatment with a hydride of an alkalinous metal with an atomic number greater than 4, under anhydrous conditions, in the presence of an ether reaction medium and a zinc catalyst which may be either elemental zinc or a compound of zinc. The presence of the ether solvent is critical and, in fact, the patent states that the ethers suitable are those having an appreciable solvent action on the halogen-substituted silane compound. A variety of ethers are said to fall within this definition, including materials such as tetrahydrofuran, diethyleneglycoldimethyl ether, dipropyl ether, dichlorodiethyl ether, etc. Thus, each of the reaction mediums described by this patent has an appreciable solvent action on the halosilane and, additionally, is an ether, that is, a material with a —C—O—C— bond.

In accordance with the present invention, I have unexpectedly discovered that silicon hydrides can be formed from silicon halides by treatment of the latter with an alkali-metal hydride in the presence of a promoter selected from the class consisting of zinc metal and zinc halides, using a sulfone as the reaction medium. That this reaction proceeds in the presence of a sulfone is surprising, and especially so in view of the just mentioned Ringwald patent. While the Ringwald patent teaches that the ether reaction medium must have an appreciable solvent action on the halosilane, the sulfones utilized according to the present invention have no significant solvent action upon either the starting silicon halide, nor the finally produced silicon hydride. The success with the non-solvent sulfones is unique, as shown by the wide variety of materials which were investigated, including esters, nitriles, amides, hydrocarbons, and tertiary-amines, each of which was inert to both the alkali-metal hydride and the chlorosilane starting material, and none of which resulted in the production of the desired silicon hydrides.

The use of sulfones in place of the ethers described by Ringwald has several significant advantages. First, sulfones are considerably safer than ethers, both from the standpoint of flammability and from the standpoint of explosivity. The sulfones are stable in the presence of air and do not form peroxides, as do ethers, which can cause an explosive mixture. Additionally, sulfones are, in general, less expensive than the ethers described in the aforementioned Ringwald patent. Because the silicon hydride product is not soluble in the various sulfone materials, recovery of the product following reaction is much simpler and more complete.

The sulfones which may be employed in the present invention are selected from the class consisting of:

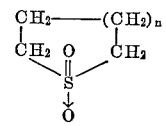

where $n$ is an integral number of from 1 to 3, and:

(2)

where R' is a monovalent hydrocarbon radical having less than 18 carbon atoms. Included among these monovalent hydrocarbon radicals are alkyl radicals of from 1 to 18 carbon atoms, such as, methyl, ethyl, propyl, isopropyl, octyl, decyl, hexadecyl, etc.; cycloalkyl radicals, such as, cyclopentyl, cyclohexyl, cycloheptyl, etc.; aryl radicals, such as phenyl, biphenyl, naphthyl, benzoylphenyl, paraphenoxyphenyl, tolyl, xylyl, etc.; aralkyl radicals, such as, benzyl, phenethyl, etc. The amount of sulfone employed is not critical, but there should be a sufficient amount present to maintain fluidity in the system. For example, there should be from about 0.5 to 5 volumes of the sulfone, for each volume of the chlorosilane employed. While the materials of Formula 1 are liquid, those of Formula 2 are solids. Thus, the latter materials must be heated to provide a melt before the reaction is initiated. Therefore, the cyclic sulfones of Formula 1 are preferred.

The amount of the alkali-metal hydride to be employed is determined by the degree of substitution of the silicon halide which is to be converted to a silicon hydride. For each gram atom of halide in the silicon halide, one mole of the alkali-metal hydride is required. Thus, as a minimum, there should be one mole of the alkali-metal hydride present in the reaction mixture for each gram atom of halide in the silicon halide. Preferably, there is at least a 15% excess of the alkali-metal hydride, based upon the stoichiometric requirements, and there can be as much as a 250% excess. Among the alkali-metal hydrides which can be employed are lithium hydride, sodium hydride, potassium hydride, and rubidium hydride. Because of cost and the commercial availability of sodium hydride, it is the preferred material. In any event, these hydrides are employed as suspensions in materials such as mineral oil.

The amount of catalyst employed can range from 0.5 mole of zinc halide or 0.5 gram atom of zinc metal per mole of the starting silicon halide up to 2 moles of zinc halide or 2 gram atoms of zinc metal for each mole of the starting silicon halide. Preferably, the reaction is carried out with a 1:1 ratio of either the zinc halide or zinc metal and the starting silicon halide. The speed of the reaction is lowered considerably when a ratio below 0.5:1 is utilized, while no advantage is realized when more than a 2:1 ratio is employed. Among the zinc halides which can be employed in the process of the present invention are zinc chloride, binc bromide, and zinc iodide. Additionally, while the reaction is somewhat slower, zinc acetate can be used.

The reaction is spontaneous and exothermic, so no external source of heat is necessary to drive the initial reaction. However, when one of the non-cyclic sulfones is utilized as the reaction medium, heat must be supplied until the material is melted. Further, after initial reaction, external heat for a period of about 1 to 3 hours is generally required to sustain and complete the reaction. It is preferred that the conversion be carried out at a temperature between 60° C. and 175° C. Further, because of a possible side reaction producing $SiH_4$, the reaction vessel should be blanketed with an inert gas, such as nitrogen.

The preferred method, for convenience, and to avoid undesirable side reactions, is to mix together, simultaneously, the silicon halide, the mineral oil dispersion of the alkali-metal hydride, the sulfone reaction medium, and the zinc catalyst. However, if desired, the halosilane and the zinc catalyst can be mixed together, with the sulfone reaction medium and the mineral oil dispersion of the alkali-metal hydride slowly added to the stirred mixture, or the alkali-metal hydride can be present in the reaction medium and the catalyst added slowly. The halosilane cannot be added to a heated (85° C. or more) mixture of the alkali-metal hydride and the zinc chloride in the sulfone reaction medium, as the exothermic nature of the formation of the silicon hydride results in the preferential reduction of the zinc halide catalyst to zinc metal, in the presence of a large excess of the alkali-metal halide.

The reaction mixture is stirred following completion of the addition, by whatever method, and after about 30 minutes, the temperature generally begins to fall from the peak attained from the exothermic reaction. When the temperature begins to fall, external heat is supplied to the reaction vessel to again raise the temperature of the contents of the vessel to about 80°–140° C. and stirring is continued at this temperature for from about one to three hours. Stirring can be continued for up to about 5 hours, with the external heating, but there is no particular advantage to such a procedure. On completion of the stirring with external heating, the external heat source is removed and stirring is stopped. The reaction mixture quickly forms two layers, the bottom layer containing the sulfone reaction medium with the catalyst and the salts formed during the reaction, the top layer consisting essentially of the silanes. The desired silicon hydrides are recovered from this top layer by fractional distillation. When lower boiling silicon hydrides, such as dimethylsilane, are produced, the product can be continuously distilled from the reaction vessel during the reaction, and recovered in a cold trap.

To enable those skilled in the art to better practice the process of the present invention, the following examples are given. These examples should be considered as illustrative only and not as limiting in any way the full scope of the present invention as covered in the appended claims. All parts in these examples are by weight.

Example 1

A mixture was formed of 7.2 parts of sodium hydride contained in an equal quantity of mineral oil, 21 parts of amyltrichlorosilane, and 63 parts of tetramethylenesulfone. This sulfone is equivalent to that shown in Formula 1 where $n$ is 1. The mixture, in a reaction vessel, was placed under a nitrogen atmosphere and 13.7 parts of anhydrous zinc chloride was added at once. Stirring was commenced immediately and the temperature began to climb, slowly at first, and then more rapidly, reaching a maximum at about 150° C. As the temperature rose, extensive refluxing was noted. After about 20 minutes, the reaction mixture began to cool and external heat was applied to maintain the temperature at about 80° C. for a period of about 90 minutes, while continuing stirring. The external heat source was then removed, and stirring was stopped. As the reaction mixture cooled, two phases formed. The top phase, yellow in color, was separated and the presence of about 60% amylsilane was detected by vapor phase chromotography. This amylsilane was separated from the mixture by fractional distillation and its structure confirmed by an infrared spectrum.

Example 2

A mixture was formed in a reaction vessel, placed under a nitrogen atmosphere, of 4.8 parts of sodium hydride, in a 50% dispersion in mineral oil and 63 parts of tetramethylenesulfone. Simultaneously, 25.3 parts of diphenyldichlorosilane and 13.7 parts of anhydrous zinc chloride were added and stirring was started. A rapid reaction occurred causing a temperature rise. When the temperature began to fall, external heat was applied to maintain a reaction temperature of 90°–100° C. for two hours. The reaction mixture was then cooled, centrifuged to provide a complete separation of the two phases, and the top phase removed and fractionally distilled. A quantity of 11 parts of diphenyl silane, equivalent to a 60% yield, was obtained. The structure of the diphenyl silane was confirmed both by an infrared spectrum, and by comparing the retention time of the material produced with the retention time of a standard diphenylsilane sample in a vapor phase chromatograph.

Example 3

A reaction vessel was blanketed with a nitrogen atmosphere. Simultaneously, 4.8 parts of sodium hydride, contained as a 50% suspension in mineral oil, 25.3 parts of diphenyldichlorosilane, and 50 parts of solid dimethylsulfone were placed in the reaction vessel. This sulfone was equivalent to Formula 2 where $R'$ is methyl. A quantity of 13.7 parts of zinc chloride was added and the reaction mixture was heated externally to melt the solid dimethyl sulfone. When the contents of the reaction vessel reached about 95° C., an exothermic reaction occurred and the temperature rose spontaneously to 160° C. Stirring was started and the temperature began to fall. External heat was supplied to maintain the temperature in the reaction vessel at 110° C. for 3 hours. Stirring was stopped, and two phases immediately formed. While still hot, the top phase was removed and fractionated, yielding 5.5 parts of diphenylsilane, equivalent to about a 30% yield of this material. The structure of this material was again confirmed by an infrared spectrum and by comparing the retention time of the material in a vapor phase chromatograph with the retention time of a standard diphenylsilane.

Example 4

A reaction vessel was equipped with a stirrer, thermometer, and condenser and the outlet of the condenser connected to a trap cooled with a Dry Ice-acetone mixture. Into the reaction vessel were placed 95 parts of tetramethylenesulfone, 4.6 parts of sodium hydride, present as a 50% suspension in mineral oil, and 12.9 parts of dimethyldichlorosilane, after blanketing the reaction vessel with a nitrogen atmosphere. A quantity of 13.6 parts of anhydrous chloride was added to the mixture and stirring begun. The temperature in the reaction vessel climbed slowly to 60° C., at which point refluxing began. When the pot temperature reached 95° C., the amount of reflux was noticeably diminished. A quantity of 5 parts of a colorless liquid had been collected in the Dry Ice-acetone cooled trap. This liquid was analyzed by infrared and the structure of dimethylsilane was confirmed. The yield of 5 parts was 83% of the theoretical.

Example 5

A mixture of 7.2 parts of sodium hydride, contained in a 50% mineral oil suspension, 50 parts of methylphenylsulfone, and 21 parts of amyltrichlorosilane is placed in a reaction vessel as described in Example 4, under a nitrogen atmosphere. The sulfone is equivalent to Formula 2 where one R' is methyl and one is phenyl. A quantity of 20 parts of zinc chloride is then added and external heat is applied to melt the methylphenylsulfone reaction medium until a temperature of 90° C. is reached. Stirring is begun. The reaction then becomes exothermic and the reaction temperature rises to about 140° C. When this temperature begins to drop, external heat is applied to maintain a reaction temperature of 85°–95° C. Stirring is stopped, the external heat source removed, and the reaction mixture separates into two phases. The top phase is removed and the amylsilane is recovered from the top phase by a fractional distillation.

Thus, a new method for producing silicon hydrides has been shown, a system not subject to the problems resulting from the use of an ether reaction medium, as described in the prior art.

What I claim as new and desire to secure by Letters Patent of the United States is:

1. A process for producing silicon hydrides having the formula $R_aSiH_b$ from silicon halides of the formula $R_aSiX_b$, where R is selected from the class consisting of hydrogen, monovalent hydrocarbon radicals, and halo-substituted monovalent hydrocarbon radicals; X is a halide radical selected from the class consisting of chlorine, bromine, iodine, and fluorine; $a$ is from 0 to 3, $b$ is from 1 to 4, and the sum of $a$ and $b$ is 4; comprising treatment of the silicon halide with an alkali metal hydride and a catalyst selected from the class consisting of zinc metal and zinc halides, utilizing as a reaction medium a sulfone selected from the class consisting of:

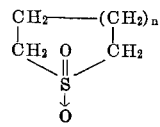

where $n$ is an integral number of from 1 to 3, inclusive, and:

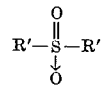

where R' is a monovalent hydrocarbon radical having less than 18 carbon atoms.

2. The process of claim 1 wherein the reaction medium is a dialkylsulfone.

3. The process of claim 1 wherein the reaction medium is an alkylarylsulfone.

4. The process of claim 1 wherein the reaction medium is a cyclic sulfone of the formula:

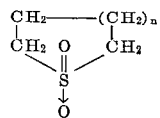

5. The process of claim 4 wherein the silicon halide is treated with sodium hydride in the presence of a zinc halide catalyst.

6. The process of claim 5 wherein the catalyst is zinc chloride.

References Cited

UNITED STATES PATENTS

| | | | |
|---|---|---|---|
| 2,406,605 | 8/1946 | Hurd | 260—448 |
| 3,050,366 | 8/1962 | Ringwald | 260—448 X |
| 3,099,672 | 7/1963 | Cooper et al. | 23—366 |
| 3,100,788 | 8/1963 | Jenkner | 260—488 |
| 3,252,752 | 5/1966 | Pohl et al. | 23—366 |

OSCAR R. VERTIZ, Primary Examiner.

G. O. PETERS, Assistant Examiner.

U.S. Cl. X.R.

260—448